(12) United States Patent
Nagai

(10) Patent No.: US 10,855,883 B2
(45) Date of Patent: Dec. 1, 2020

(54) IMAGE PROCESSING APPARATUS FOR PERFORMING EDGE CORRECTION OF IMAGE, METHOD OF CONTROLLING THE SAME, AND STORAGE MEDIUM

(71) Applicant: CANON KABUSHIKI KAISHA, Tokyo (JP)

(72) Inventor: Jun Nagai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 16/222,844

(22) Filed: Dec. 17, 2018

(65) Prior Publication Data

US 2019/0208083 A1 Jul. 4, 2019

(30) Foreign Application Priority Data

Dec. 28, 2017 (JP) ................ 2017-254401

(51) Int. Cl.
*H04N 1/409* (2006.01)
*H04N 1/00* (2006.01)

(52) U.S. Cl.
CPC ....... *H04N 1/4092* (2013.01); *H04N 1/00005* (2013.01); *H04N 1/00045* (2013.01); *H04N 1/00082* (2013.01)

(58) Field of Classification Search
CPC ............ H04N 1/4092; H04N 1/00082; H04N 1/00045; H04N 1/00005; H04N 1/40062
See application file for complete search history.

(56) References Cited

U.S. PATENT DOCUMENTS 7,982,913 B2   7/2011   Kaburagi ............... 358/1.9

FOREIGN PATENT DOCUMENTS

JP   2006-295877   10/2006

*Primary Examiner* — Christopher Wait
(74) *Attorney, Agent, or Firm* — Venable LLP

(57) ABSTRACT

Based on a target pixel of image data obtained by performing a halftone process on multi-gradation image data, the image processing apparatus estimates whether or not the target pixel is a pixel that corresponds to an edge portion of an object included in the image data, and, if the target pixel estimated to be positioned at the edge portion is a white pixel, determines whether or not the target pixel is an isolated pixel based on the peripheral pixels of the target pixel, and corrects the target pixel, which is determined to not be the isolated pixel, to a pixel having a predetermined density or more.

9 Claims, 20 Drawing Sheets

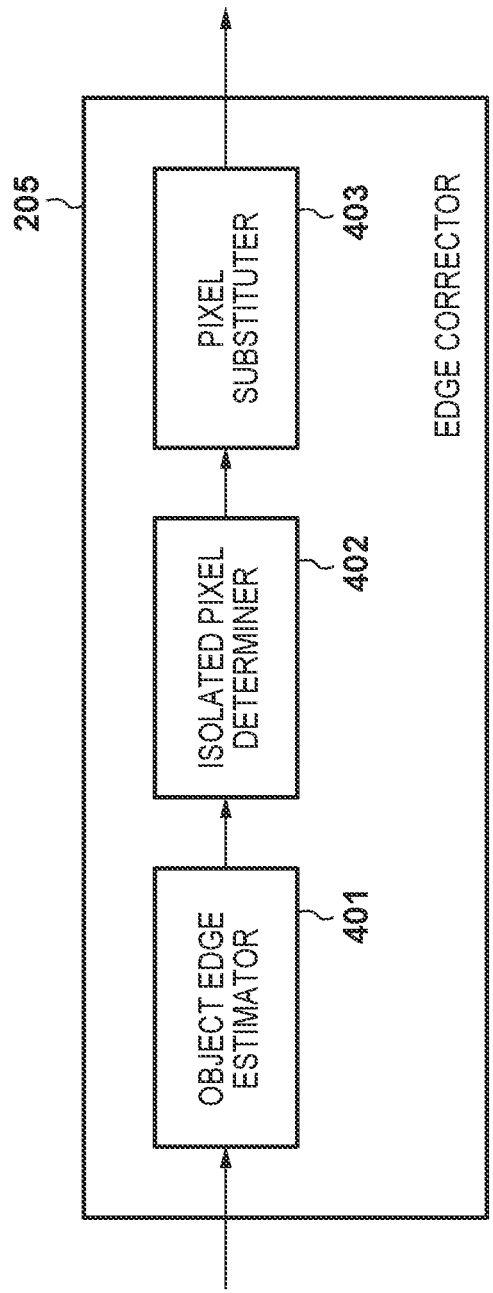

FIG. 5A — TARGET PIXEL

REFERENCE WINDOW (9×9 PIXELS)     SCREEN PATTERN (600dpi/141 LINES)

REFERENCE WINDOW (11×11 PIXELS)     SCREEN PATTERN (600dpi/106 LINES)

FIG. 11A

TARGET PIXEL

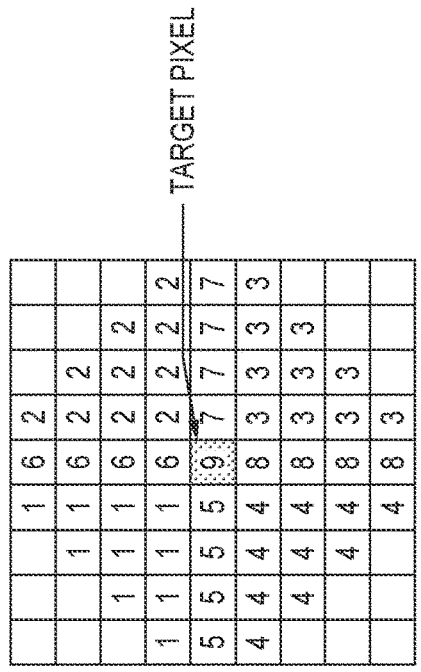
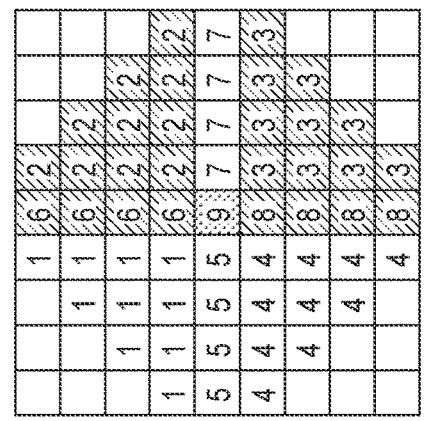
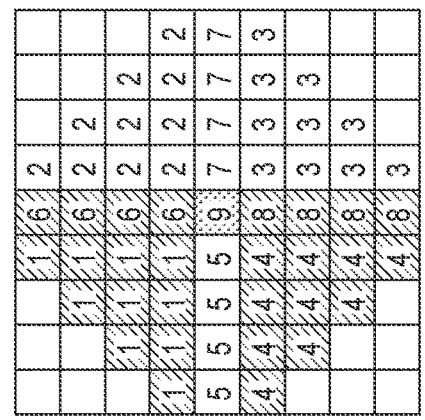
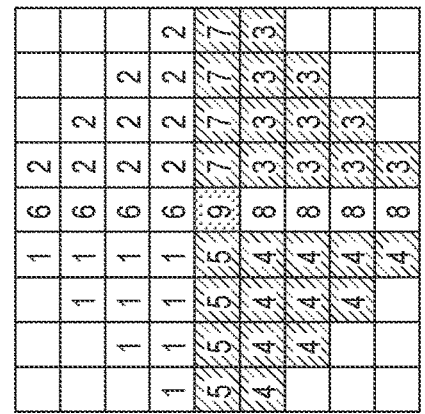
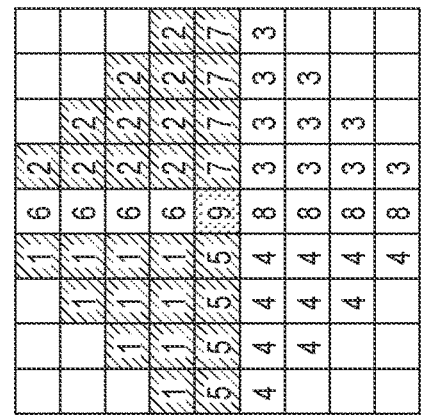

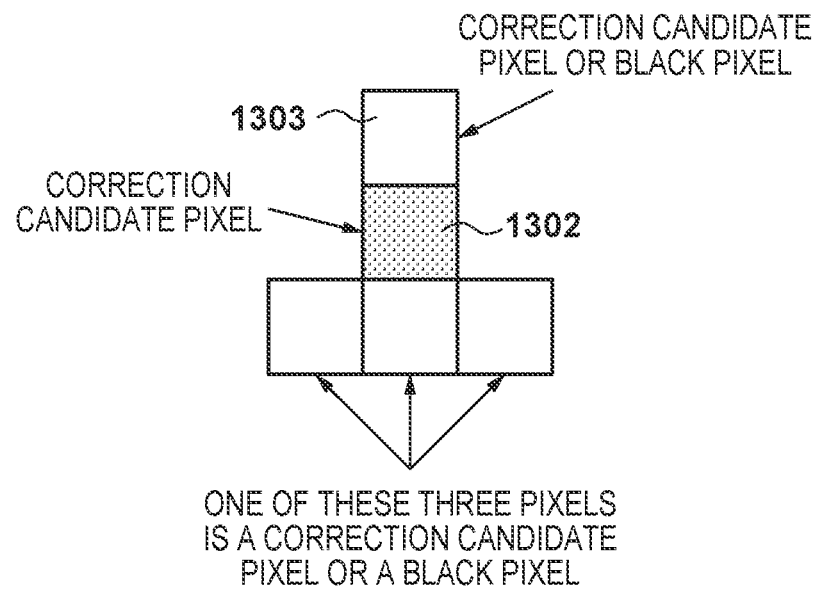
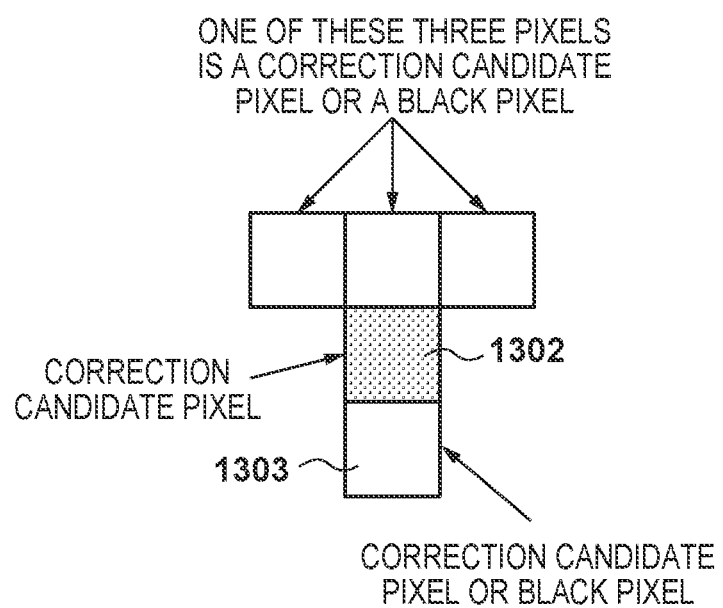

IMAGE PROCESSING APPARATUS FOR PERFORMING EDGE CORRECTION OF IMAGE, METHOD OF CONTROLLING THE SAME, AND STORAGE MEDIUM

BACKGROUND OF THE INVENTION

Field of the Invention

The present invention relates to an image processing apparatus for performing edge correction of an image, a method of controlling the same, and a storage medium.

Description of the Related Art

In an image forming apparatus, there are cases where stagger (jaggies) occurs at edge portions such as for text or the like due to image processing that is applied in conjunction with image formation. In particular, it is likely for jaggies to occur when a pseudo-halftone process as in screen processing is applied. Accordingly, several techniques for reducing the occurrence of jaggies caused by the pseudo-halftone process as in screen processing have been proposed. For example, Japanese Patent Laid-Open No. 2006-295877 recites generating correction data for edge portions from image data before screen processing, and adding the correction data to the image data after the screen processing so as to rim the image data. Specifically, in the image data before the screen processing, a determination of whether or not there is an edge portion for which edge correction processing should be performed is made, and when it is determined that there is such an edge portion, the correction data and the image data after the screen processing are compared, and data having a larger value is output in the edge portion. With this, the jaggies due to the screen processing are smoothly corrected for the edge portion.

The foregoing method recited in Japanese Patent Laid-Open No. 2006-295877 performs a detection of an edge portion that should be corrected and creation of correction data based on image data before the screen processing, and applies a result thereof to the image data after the screen processing. However, in a low-cost system where image data before screen processing is multi-value contone data, to hold the contone data for edge portion correction would lead to a cost increase.

In addition, there are also cases where image formation is performed after receiving image data that has been subject to screen processing, in accordance with an environment where an image forming apparatus is used. In such cases, it may not be possible to obtain image data before the screen processing for correction of an edge portion, and correction of edge portions may not be possible.

SUMMARY OF THE INVENTION

An aspect of the present invention is to eliminate the above-mentioned problem with conventional technology.

A feature of the present invention is to provide a technique for correcting jaggies of edge portions in image data that has been subject to screen processing.

According to a first aspect of the present invention, there is provided an image processing apparatus, comprising: a controller having a processor which executes instructions stored in a memory or having a circuitry, the controller functioning as: an estimation unit configured to, based on a target pixel of image data obtained by performing a halftone process on multi-gradation image data, where the image data resulting from performing the halftone process has a lower gradation than the multi-gradation image data, and peripheral pixels of the target pixel, estimate whether or not the target pixel is a pixel that corresponds to an edge portion of an object included in the image data; a determination unit configured to, if the target pixel estimated to be positioned at the edge portion by the estimation unit is a white pixel, determine whether or not the target pixel is an isolated pixel based on the peripheral pixels of the target pixel; and a correction unit configured to correct the target pixel, which is determined to not be the isolated pixel by the determination unit, to a pixel having a predetermined density or more.

According to a second aspect of the present invention, there is provided an image processing apparatus, comprising: a controller having a processor which executes instructions stored in a memory or having a circuitry, the controller functioning as: an estimation unit configured to estimate whether or not a target pixel of image data obtained after screen processing is a pixel positioned at an edge portion of an object included in the image data; a first determination unit configured to determine whether or not the target pixel estimated to be positioned at the edge portion by the estimation unit is included in an area that was subject to screen processing; a second determination unit configured to determine whether or not the target pixel determined by the first determination unit to be included in the area subject to the screen processing is a white pixel that is a pixel that is to be corrected; and a correction unit configured to correct the target pixel, which is determined by the second determination unit to be the white pixel which is the pixel to be corrected, to a pixel having a predetermined density or more.

According to a third aspect of the present invention, there is provided a method of controlling an image processing apparatus, the method comprising: based on a target pixel of image data obtained by performing a halftone process on multi-gradation image data, where the image data resulting from performing the halftone process has a lower gradation than the multi-gradation image data, and peripheral pixels of the target pixel, estimating whether or not the target pixel is a pixel that corresponds to an edge portion of an object included in the image data; if the target pixel estimated to be positioned at an edge portion is a white pixel, determining whether or not the target pixel is an isolated pixel based on the peripheral pixels of the target pixel; and correcting the target pixel, which is determined to not be the isolated pixel, to a pixel having a predetermined density or more.

According to a fourth aspect of the present invention, there is provided a method of controlling an image processing apparatus, the method comprising: estimating whether or not a target pixel of image data obtained after screen processing is a pixel positioned at an edge portion of an object included in the image data; determining whether or not the target pixel estimated to be positioned at the edge portion is included in an area that was subject to screen processing; determining whether or not the target pixel determined to be included in the area subject to the screen processing is a white pixel that is a pixel that is to be corrected; and correcting the target pixel, which is determined to be the white pixel which is the pixel to be corrected, to a pixel having a predetermined density or more.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodi

FIG. 4 is a functional block diagram for describing functions of an edge corrector according to the first embodiment.

FIGS. 5A through 5E depict views for describing a reference window for determining whether or not there is an edge portion, and examples of pattern matching for an upper edge, a lower edge, a left edge, and a right edge of an object, in an object edge estimator according to the first embodiment.

FIGS. 11A through 11I depict views for describing a reference window for determining whether or not there is an edge portion, and examples of pattern matching for an upper edge, a lower edge, a left edge, and a right edge of an object, in an object edge estimator according to the second embodiment.

FIGS. 12A through 12E depict views for describing pattern matching in a correction candidate pixel determiner according to the second embodiment.

FIGS. 13A through 13D depict views for describing processing for determining an isolated pixel in an isolated pixel determiner according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, in the present embodiment, description is given by taking a laser printer (a printing apparatus) which is an electrophotographic method monochrome image forming apparatus as an example of an image processing apparatus according to the present invention, but the spirit of the present invention is not limited to this. Without deviating from the spirit of the present invention, application can also be made to an ink-jet printing apparatus or a typical color-image forming apparatus, and also a communication apparatus, a PC or the like that performs image formation, for example.

First Embodiment

Figure 1:
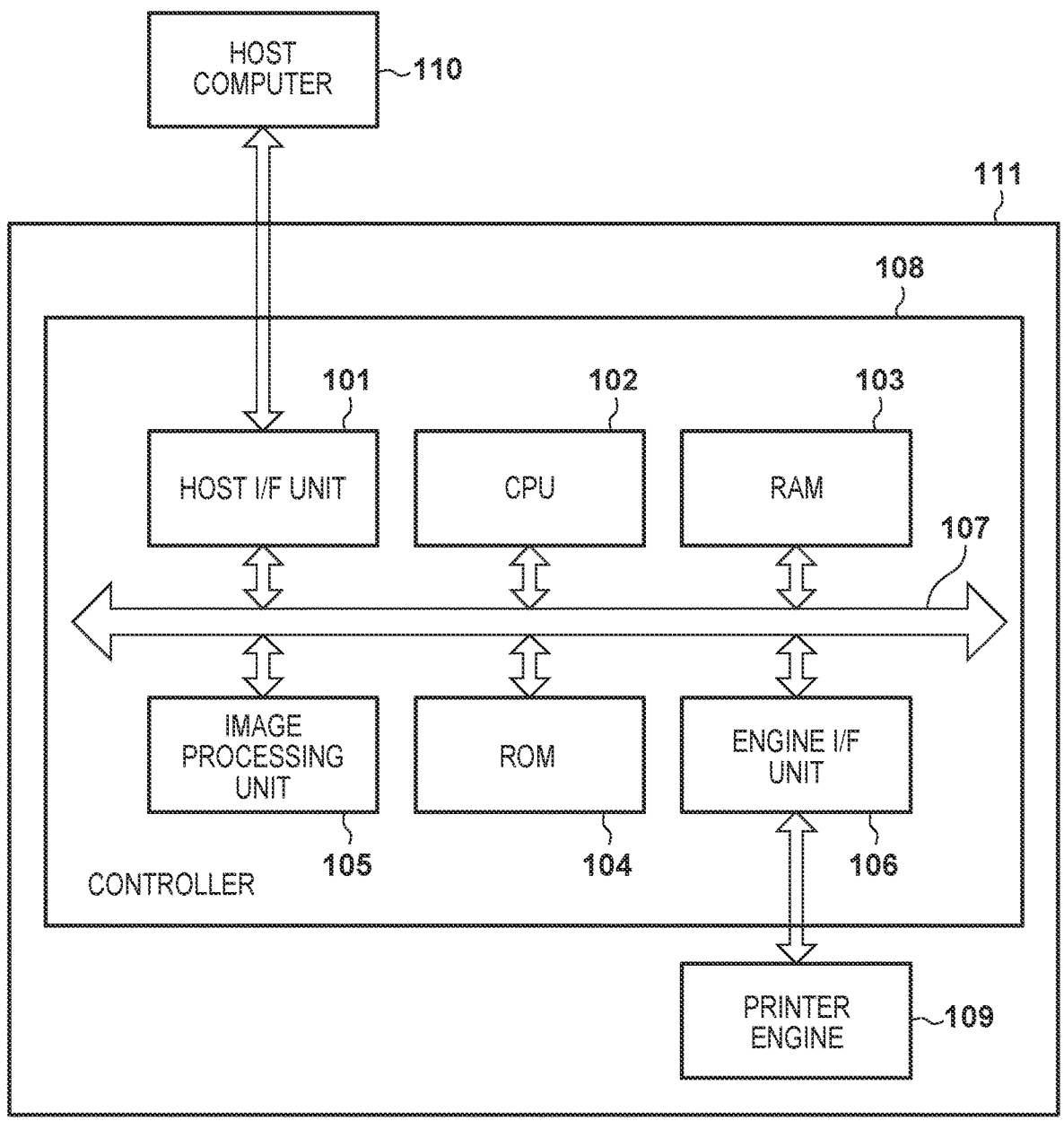
- FIG. 1 depicts a view that illustrates a configuration of an image processing system that includes an image forming apparatus (a printing apparatus) according to a first embodiment of the present invention.

FIG. 1 depicts a view that illustrates a configuration of an image processing system that includes an image forming apparatus (a printing apparatus) 111 according to a first embodiment of the present invention.

This image processing system includes a host computer 110 and the printing apparatus 111. The printing apparatus 111 is an example of an image processing apparatus according to the present invention, and is provided with a controller 108 and a printer engine 109.

An application (not shown) that operates on the host computer 110 generates a page layout document, a word processor document, a graphic document, or the like. From this digital document data generated by the application, a drawing command based on the digital document is generated by a printer driver (not shown). Note that the digital document data processed by the printer driver is not limited to something that is generated by the host computer 110, and may be data that is generated by an application of another computer or a scanner, and saved on the host computer 110. A page description language for generating page image data that is referred to as PDL (Page Description Language) is typical as the drawing command generated here. This drawing command normally includes a command for drawing data such as an image, graphics, and text, as well as print settings relating to printing, such as a print resolution, as control commands.

The drawing command generated by the printer driver is transmitted to the printing apparatus 111 via a network. In the printing apparatus 111, the controller 108 generates print data of a format that the printer engine 109 can print, based on the drawing command received from the host computer 110. The printer engine 109 prints an image based on the print data outputted by the controller 108.

Next, description is given regarding a configuration of the controller 108.

The controller 108 has a host I/F (interface) unit 101, a CPU 102, a RAM 103, a ROM 104, an image processing unit 105, an engine I/F unit 106, and an internal bus 107. The host I/F unit 101 is an interface for receiving a drawing command transmitted from the host computer 110. For example, it is configured by something such as Ethernet (registered trademark), a serial interface, or a parallel interface. The CPU 102 controls the printing apparatus 111 by using data and a program deployed from the ROM 104 to the RAM 103, and also executes processing described below that the controller 108 performs. The RAM 103 provides a loading area for programs executed by the CPU 102, and a work area that is used when various processing is executed. The ROM 104 stores data and a program for causing the CPU 102 to execute various processing described later, setting data of the controller 108, and the like.

In accordance with a setting from the CPU 102, the image processing unit 105 performs image processing for printing on the drawing command received by the host I/F unit 101 to thereby generate print data that can be processed by the printer engine 109. The image processing unit 105 performs processing for analyzing drawing commands received from the host computer 110 to generate drawing objects, and also performs rasterization processing to thereby generate a bitmap image. Here, the bitmap image is multi-value image data having, for example, an 8-bit (256 gradations) value for one pixel. In addition, the image processing unit 105 applies image processing such as a color conversion process and screen processing in accordance with a print setting to the generated bitmap image to convert it to print data of a format that can be processed by the printer engine 109. Details regarding processing by the image processing unit 105 are described later. The print data generated here is transmitted to the printer engine 109 via the engine I/F unit 106. The internal bus 107 is a system bus that connects each unit described above.

Note that, in the embodiments, description is given of an example in which functions of the image processing unit 105 are achieved by the CPU 102 executing a program that has been deployed to the RAM 103. However, the image processing unit 105 may be configured by hardware such as an ASIC (Application Specific Integrated Circuit), for example. In addition, each function of the image processing unit 105 may be realized by a processor such as the CPU 102 cooperating with a hardware circuit. For example, it is possible to realize processing such as color conversion or density correction by a general-purpose processor, and realize processing with a high computational cost such as screen processing or edge correction processing by hardware such as an ASIC.

Figure 2:
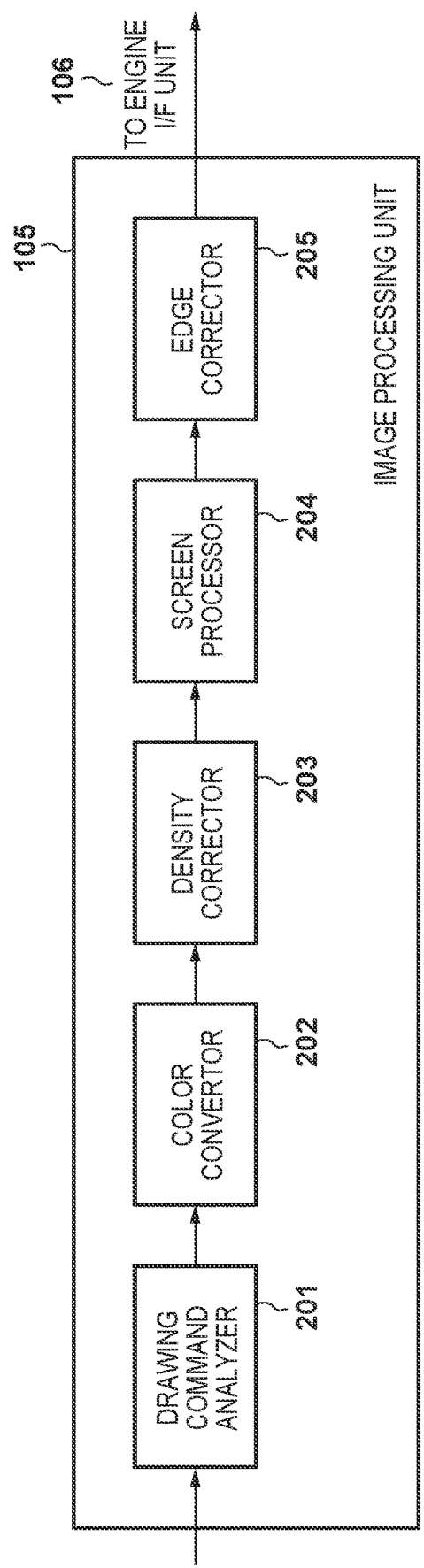
FIG. 2 is a functional block diagram for describing functions of an image processing unit according to the first embodiment.

FIG. 2 is a functional block diagram for describing functions of the image processing unit 105 according to the first embodiment.

The image processing unit 105 has a drawing command analyzer 201, a color convertor 202, a density corrector 203, a screen processor 204, and an edge corrector 205. The drawing command analyzer 201 performs an analysis process and a rasterization process on a drawing command received by the host I/F unit 101 to thereby generate multi-value image data. The color convertor 202 performs a process for converting a grayscale color space or an RGB color space for the multi-value image data to a K (black) color space that corresponds to black toner. By this color conversion process, multi-value image data having a multi-value density value (a gradation value, also referred to as a signal value) with 8 bits (256 gradations) or the like for each single pixel is generated. The density corrector 203 uses a one-dimensional lookup table to execute a density correction process for correcting the image data that was subject to the color conversion process, so that density characteristics for when the print data is printed on a paper medium are those that are desired. In accordance with a change of the state of the printer engine 109, the CPU 102 may rewrite this one-dimensional lookup table. The image data after the density correction is inputted to the screen processor 204.

The screen processor 204 performs screen processing which is a pseudo-halftone process on the image data that was subject to a density correction by the density corrector 203. It is often the case that the printer engine 109 can typically only output a few gradations such as 2, 4, or 16 gradations. Consequently, the screen processor 204 performs a pseudo-halftone process in accordance with screen processing to enable a stable halftone representation even in the printer engine 109 which can only output a small number of gradations. In the first embodiment, screen processing having a 1-bit output (2 gradations) is performed. In other words, the image data after the screen processing comprises two types of pixels: black pixels printed by toner, and white pixels that are not printed. The image data, which has been subject to screen processing is this fashion, is stored in a buffer (not shown) in the screen processor 204. Note that, because the image data after screen processing is 1-bit data for one pixel with respect to 8-bit data for one pixel in the case of image data before screen processing, the storage area of the buffer is ⅛ of the size of the image data before the screen processing.

Figure 3A:
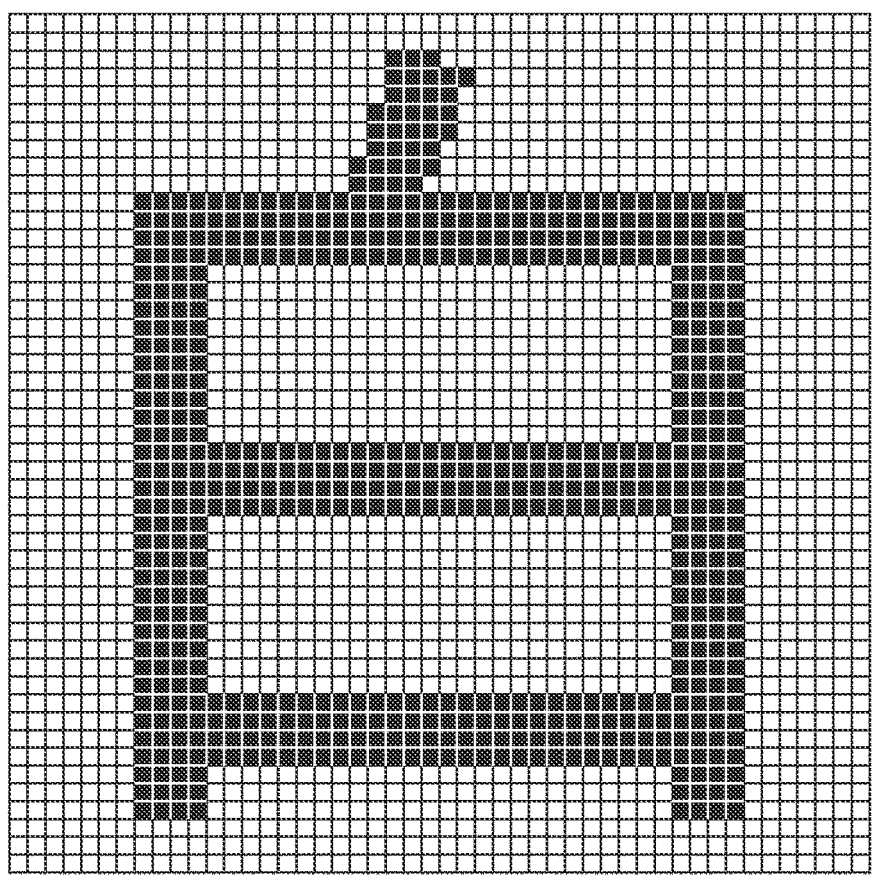
FIGS. 3A and 3B depict views for describing the situation of changes in image data before and after screen processing by a screen processor according to the first embodiment.
Figure 3B:
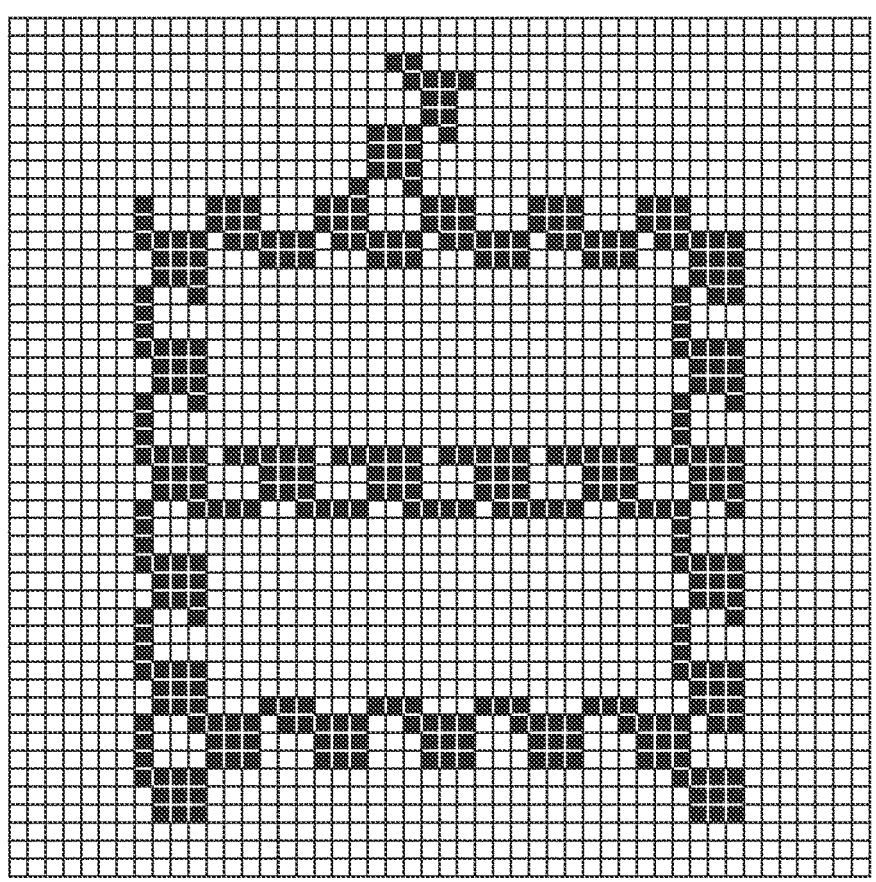

FIGS. 3A and 3B depict views for describing the situation of changes in image data before and after screen processing by the screen processor 204 according to the first embodiment.

FIG. 3A illustrates image data before screen processing, and FIG. 3B illustrates image data after screen processing. Here, FIG. 3A illustrates image data that renders 6-point character data at a print resolution of 600 dpi, where the density is 60%. FIG. 3B illustrates a result of screen processing the image data of FIG. 3A by a screen of 141 lines. As is apparent from FIG. 3B, the edge portion of the character have stagger as a result of the screen processing, and this is a cause of jaggies. Accordingly, the edge corrector 205, which is arranged downstream of the screen processor 204, performs edge correction processing for correcting these jaggies.

FIG. 4 is a functional block diagram for describing functions of the edge corrector 205 according to the first embodiment.

The edge corrector 205 has an object edge estimator 401, an isolated pixel determiner 402, and a pixel substituter 403. The object edge estimator 401 estimates an edge of an object by using a reference window to determine whether or not a target pixel in image data is an edge of an object that has been subject to screen processing.

FIGS. 5A through 5E depict views for describing a reference window for determining whether or not there is an edge portion, and examples of pattern matching for an upper edge, a lower edge, a left edge, and a right edge of an object, in the object edge estimator 401 according to the first embodiment.

Figures 5A, 5B, 5C, 5D, 5E:
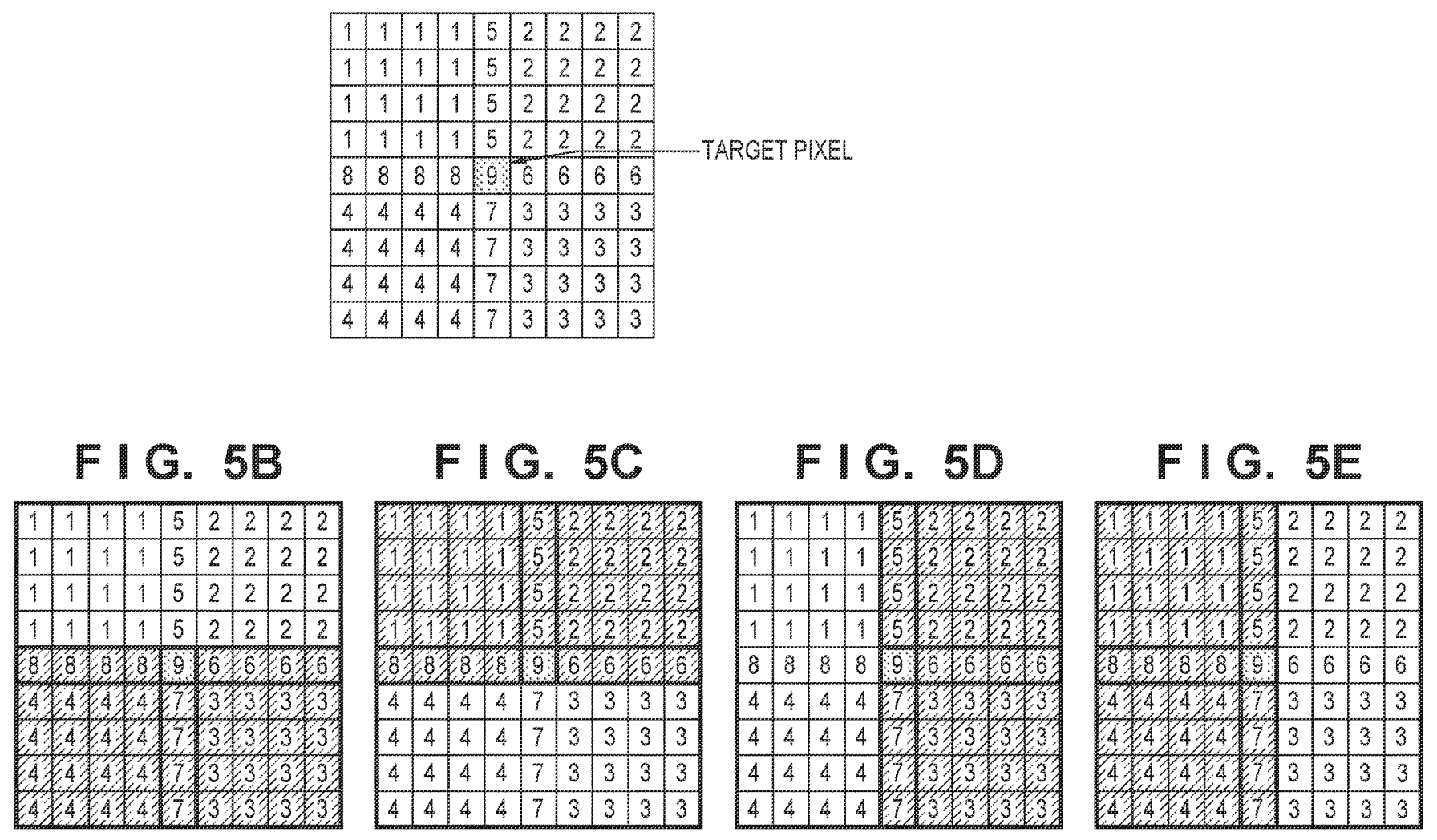

FIG. 5A illustrates an example of a reference window used in the first embodiment, and this window is divided into areas "1" through "9". Note that the area "9" corresponding to the center corresponds to the target pixel.

This reference window is applied to each pixel in the image data, and when the distribution of peripheral pixels for the target pixel matches a corresponding one of a plurality of predetermined patterns that are described below, it is determined that the target pixel is positioned at an upper edge, a lower edge, a left edge, or a right edge of an object, respectively.

FIG. 5B illustrates a pattern for determining the upper edge of an object. In the first embodiment, if the areas "1", "2", and "5" are all white pixels and there is even one black pixel in each of the areas "3", "4", "6", "7", and "8", it is determined that the target pixel of the area "9" is positioned at an upper edge of the object that was subject to screen processing.

FIG. 5C illustrates a pattern for determining the lower edge of an object. In the first embodiment, if the areas "3", "4", and "7" are all white pixels and there is even one black pixel for each of the areas "1", "2", "5", "6", and "8", it is determined that the target pixel of the area "9" is positioned at a lower edge of the object that was subject to screen processing.

FIG. 5D illustrates a pattern for determining the left edge of an object. In the first embodiment, if the areas "1", "4", and "8" are all white pixels and there is even one black pixel for each of the areas "2", "3", "5", "6", and "7", it is determined that the target pixel of the area "9" is positioned at a left edge of the object that was subject to screen processing.

FIG. 5E illustrates a pattern for determining the right edge of an object. In the first embodiment, if the areas "2", "3", and "6" are all white pixels and there is even one black pixel for respective areas of the areas "1", "4", "5", "7", and "8", it is determined that the target pixel of the area "9" is positioned at a right edge of the object that was subject to screen processing.

Note that the reference window used in the first embodiment is configured by 9×9 pixels. This is a window size for which it is possible to determine the edge of an area that was subject to screen processing where the number of lines of the screen is in the neighborhood of 120 lines or more, at a print resolution of 600 dpi.

Figure 6A:
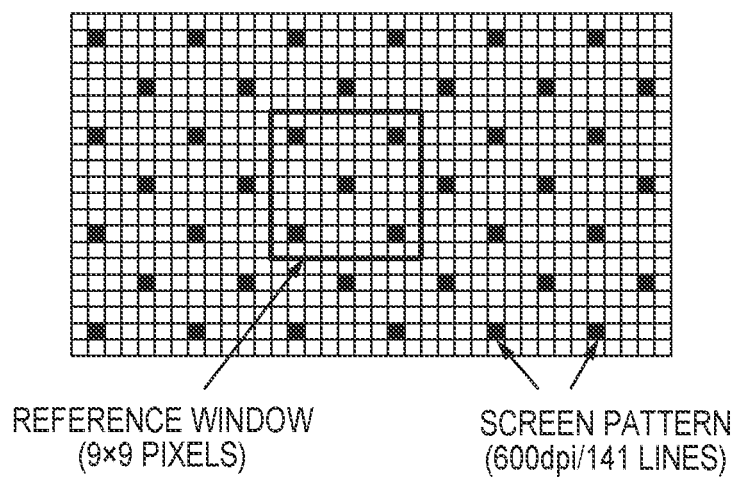
FIGS. 6A through 6C depict views for considering the size of reference windows.
Figure 6B:
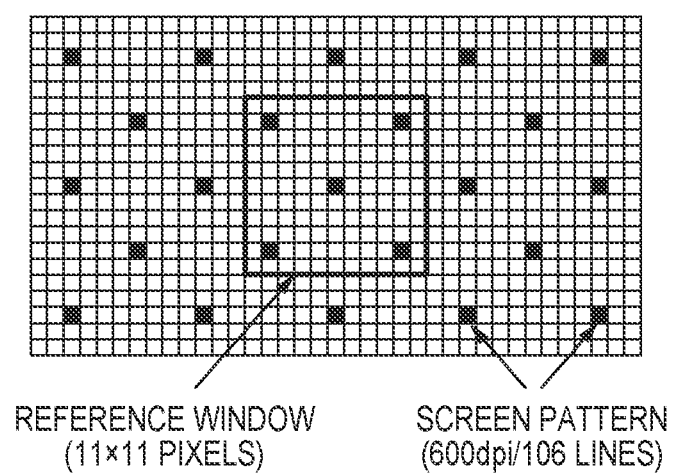

FIGS. 6A and 6B depict views for considering the size of reference windows.

FIG. 6A illustrates a screen pattern for a case of applying a screen having 141 lines, with a print resolution of 600 dpi. Illustration is given for an example of causing a reference window having a window size of 9×9 pixels to be applied to this area. From this figure, in the case of a window size of 9×9 pixels, there are black pixels in white determination areas for the four directions, even for a highlight portion where few dots are printed in an area subject to screen processing. Meanwhile, it is evident that, in the case where there are no black pixels in white determination areas and there are black pixels in respective black determination areas, it is possible to estimate that there is an edge of an area subject to screen processing having a predetermined number of lines or more.

Note that, at a time of a determination of an edge, it is necessary to change the window size used as the reference, in accordance with the number of screen lines applied and the print resolution. In a case of making a determination for screen area where a dither with a lower number of lines is applied, or with a higher print resolution, it is necessary to have a reference window with a larger window size. For example, in the case where a screen of 106 lines is applied, it is evident that a reference window with a window size of 11×11 pixels is necessary, as illustrated by FIG. 6B.

Figure 6C:
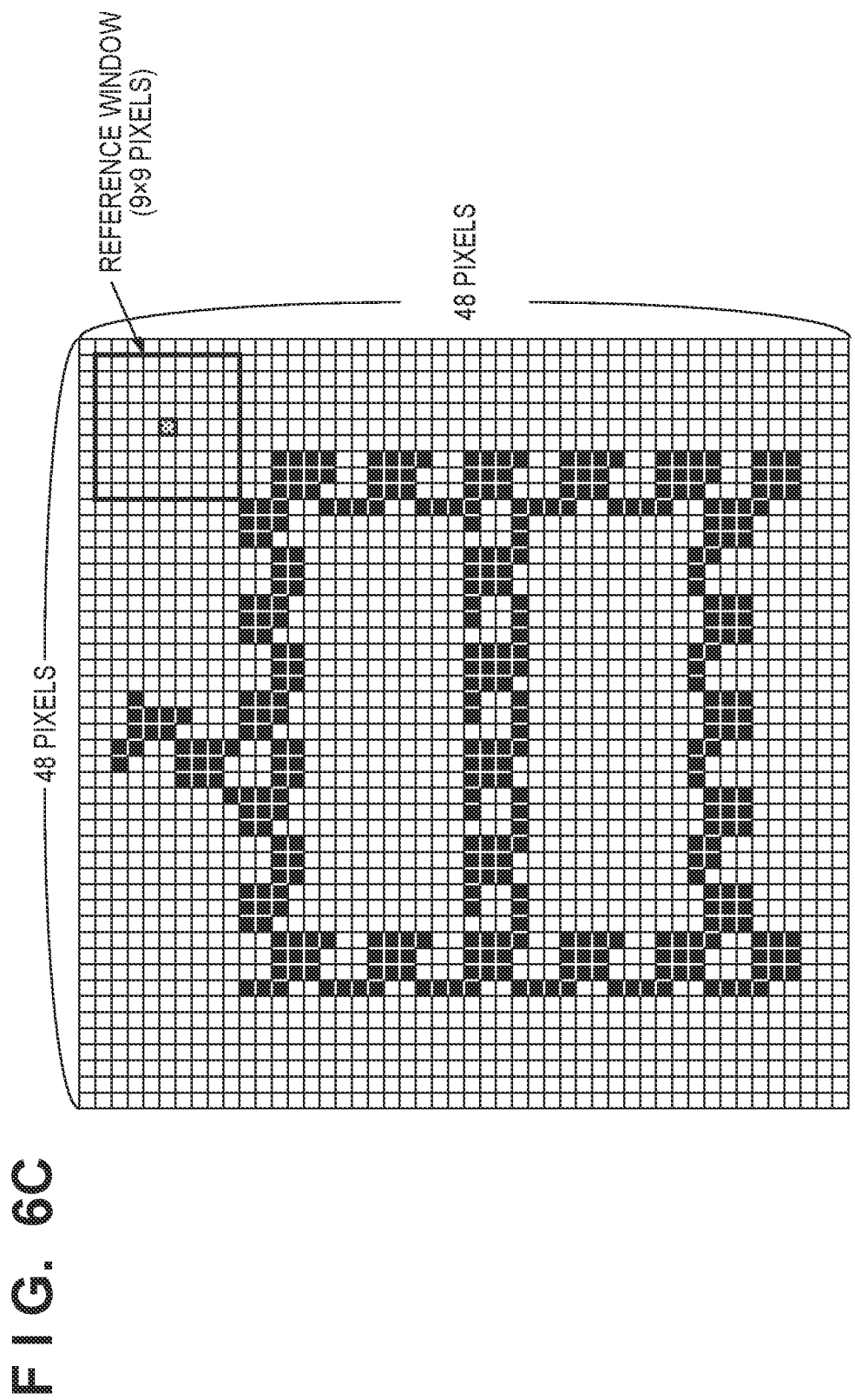

Note that an example of comparing the size of a reference window of 9×9 pixels and the size of image data to which processing is applied is illustrated in FIG. 6C. When 6-point character data is rendered at a print resolution of 600 dpi, it is configured from approximately 50×50 pixels. FIG. 6C illustrates an example of character data comprising the 48×48 pixels illustrated in FIG. 3B.

By setting each pixel of the image data as a target pixel one-by-one and performing pattern matching in accordance with the reference windows described above, it is determined whether or not the target pixel is an edge of an object that was subject to screen processing. In this way, in the case where a pixel estimated to be the edge of an object is a white pixel, the pixel becomes a correction candidate pixel.

Next, in regarding a correction candidate pixel for an edge of an object estimated by the object edge estimator 401, the isolated pixel determiner 402 determines whether or not the correction candidate pixel is an isolated pixel. Here, isolated pixel refers to a pixel having no adjacent pixels in a main scanning direction or a sub-scanning direction. In the edge estimation by the object edge estimator 401, at least some pixels that are not object edges are detected due to determination error. Consequently, pixels that are not object edges are determined and removed from correction candidates by the isolated pixel determiner 402. For a correction candidate pixel, a determination is made as to whether or not it can become an isolated pixel as a result of the correction candidate pixel being corrected. If it is determined that it will become an isolated pixel, the correction candidate pixel is removed from correction candidates, and those that ultimately remain become correction candidate pixels that are to be targets of correction processing.

Figure 7A:
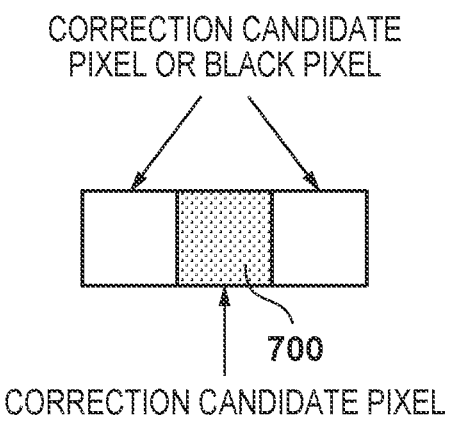
FIGS. 7A and 7B depict views for describing processing for determining an isolated pixel in an isolated pixel determiner according to the first embodiment.
Figure 7B:
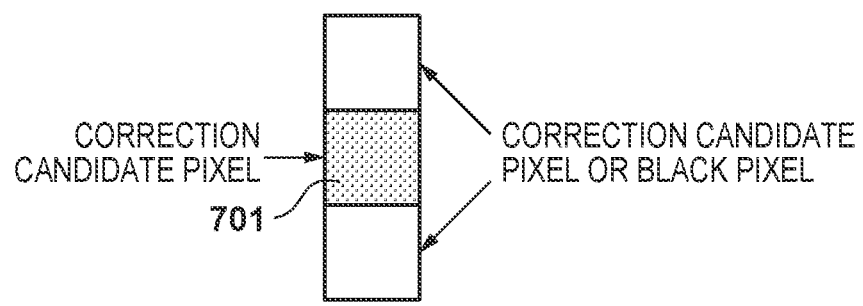

FIGS. 7A and 7B depict view for describing processing for determining an isolated pixel in the isolated pixel determiner 402 according to the first embodiment.

FIG. 7A illustrates a situation for a determination of whether or not there is an isolated pixel with respect to the main scanning direction. In other words, with respect to a central correction candidate pixel 700, if there are adjacent correction candidate pixels or black pixels on both neighboring sides in the main scanning direction, this pixel is not an isolated pixel and becomes a pixel that is a correction target. In addition, FIG. 7B illustrates a situation for a determination of whether or not there is an isolated pixel with respect to the sub-scanning direction. In other words, with respect to a central correction candidate pixel 701, if there are correction candidate pixels or black pixels that are vertically adjacent, this pixel is not an isolated pixel and becomes a pixel that is a correction target.

Isolated pixels determined by the isolated pixel determiner 402 are removed from correction candidate pixels, and the pixel substituter 403 performs pixel substitution on pixels that finally become targets of correction. In other words, white pixels are substituted with black pixels.

Note that, although 1-bit output (two gradations) is taken as an example in the first embodiment, if the printer engine 109 can output multi-value gradations such as 4 or 16 gradations, for example, a substitute pixel in accordance with characteristics here may be a multi-value grey pixel (a pixel of a predetermined density or more).

Figure 8:
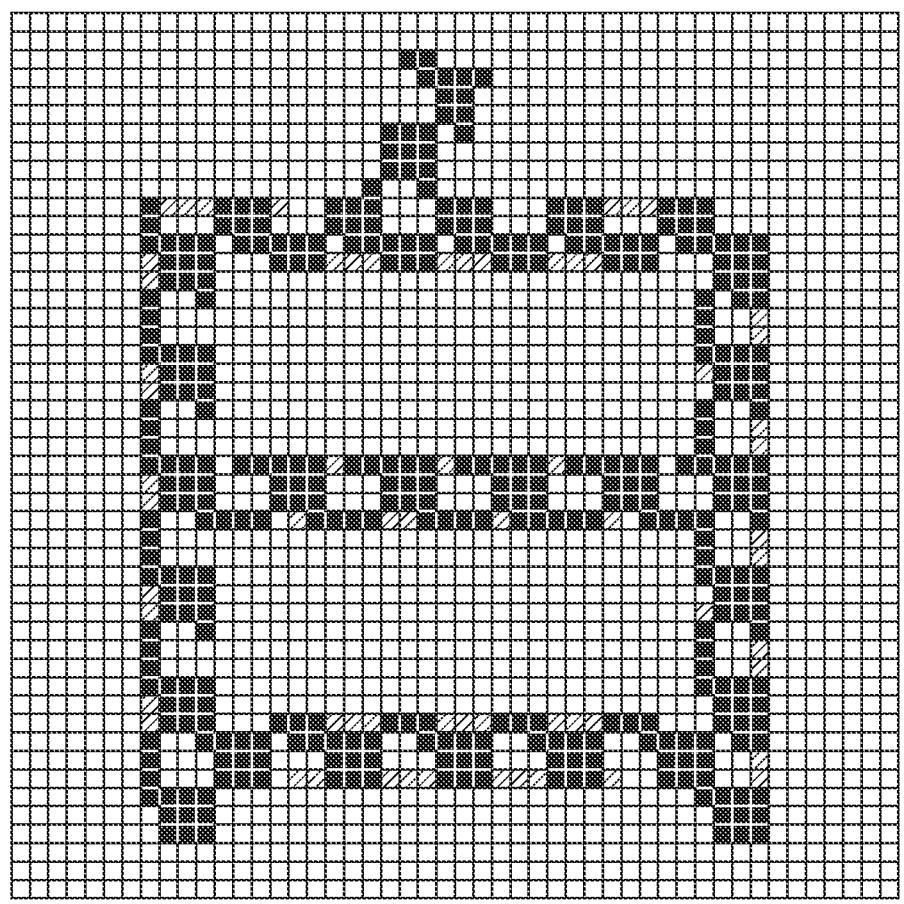
FIG. 8 depicts a view for describing an example of an effect of the first embodiment.

FIG. 8 depicts a view for describing an example of an effect of the first embodiment.

FIG. 8 illustrates an example of applying processing according to the first embodiment to image data after the screen processing of FIG. 3B. In the figure, pixels indicated by diagonal lines indicate pixels for which substitution with black pixels has been performed as a result of processing by the edge corrector 205. It is understood that jaggies of an edge portion are corrected by the first embodiment in this way.

Figure 9:
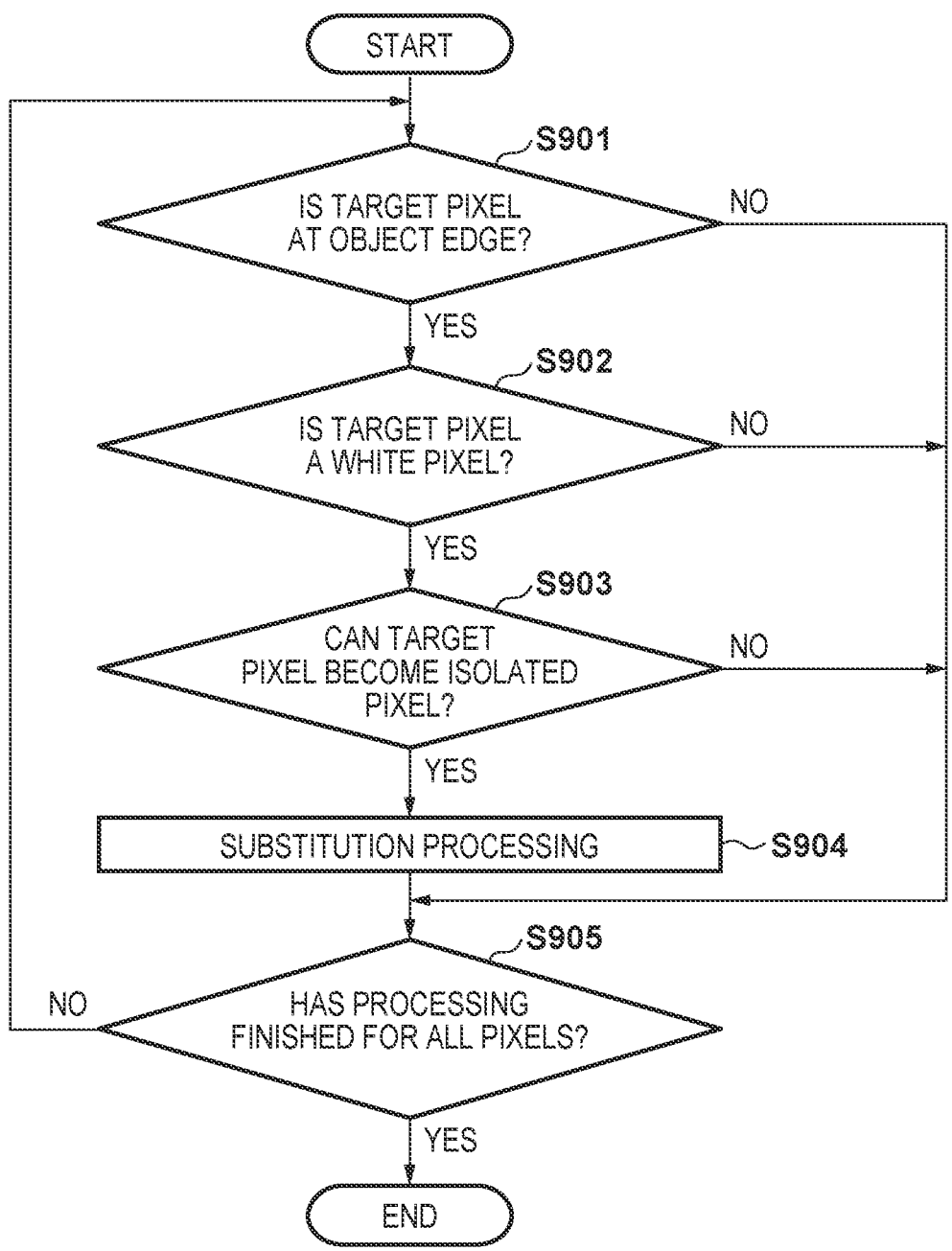
FIG. 9 is a flowchart for describing processing of an edge corrector according to the first embodiment.

FIG. 9 is a flowchart for describing processing of the edge corrector 205 according to the first embodiment. Note that the processing procedure illustrated by this flowchart is achieved by the CPU 102 executing a program deployed to the RAM 103. Note that inputted image data is image data that has been subject to screen processing.

Firstly, in step S901, the CPU 102 functions as the object edge estimator 401 to perform pattern matching using the reference window of FIG. 5A previously described, with each pixel of the image data as a target pixel. It is determined whether or not the target pixel is an object edge that was subject to screen processing. In a case where an object edge is determined here the processing advances to step S902, but otherwise the processing advances to step S905. In step S902, the CPU 102 determines whether or not the target pixel is a white pixel. If the target pixel is determined to be a white pixel, the pixel is set as a correction candidate pixel, and the processing advances to step S903. In contrast, when it is determined that the target pixel is not a white pixel, the processing advances to step S905.

In step S903, the CPU 102 functions as the isolated pixel determiner 402, and determines whether or not the correction candidate pixel will become an isolated pixel as a result of correction. When it is determined that the correction candidate pixel will not become an isolated pixel, the processing advances to step S904, and the CPU 102 functions as the pixel substituter 403 to substitute the white pixel with a black pixel, and then the processing advances to step S905. If the CPU 102 determines in step S903 that the correction candidate pixel will become an isolated pixel, the processing advances to step S905 without pixel substitution being performed. In step S905, the CPU 102 determines whether or not the processing described above has finished for all pixels of the inputted image data, and the processing returns to step S901 if it has not finished for all pixels, and this processing ends if it has finished for all pixels. In this way, when this processing is applied to all pixels of the inputted image data, edge correction processing ends.

By virtue of the first embodiment as described above, object edges in image data after screen processing are estimated, and it is determined whether or not pixels estimated to be these edges are correction target pixels based on information of peripheral pixels. A pixel determined to be a correction target pixel is substituted with a black pixel. With this, it is possible to correct jaggies of edge portions that occur in a case of screen processing.

Second Embodiment

In the first embodiment described above, the object edge estimator 401 performs estimation of an edge in horizontal directions and vertical directions. This is because a pattern for the pattern matching used in edge estimation was a pattern for estimating only a portion that was a straight line in a horizontal direction or a vertical direction. However, an edge portion of character data that needs correction may be where a curve is drawn or where lines cross, for example, and it is possible that such edge portions cannot be corrected in the first embodiment. Accordingly, the second embodiment is described by an example where it is also possible to correct edge portions in a an oblique direction with respect to a horizontal direction or a vertical direction, as with a curve or a crossed lines. Note that, because the configuration of the system and the printing apparatus 111 according to the second embodiment are similar to that in the first embodiment described above, detailed description thereof is omitted.

Figure 10:
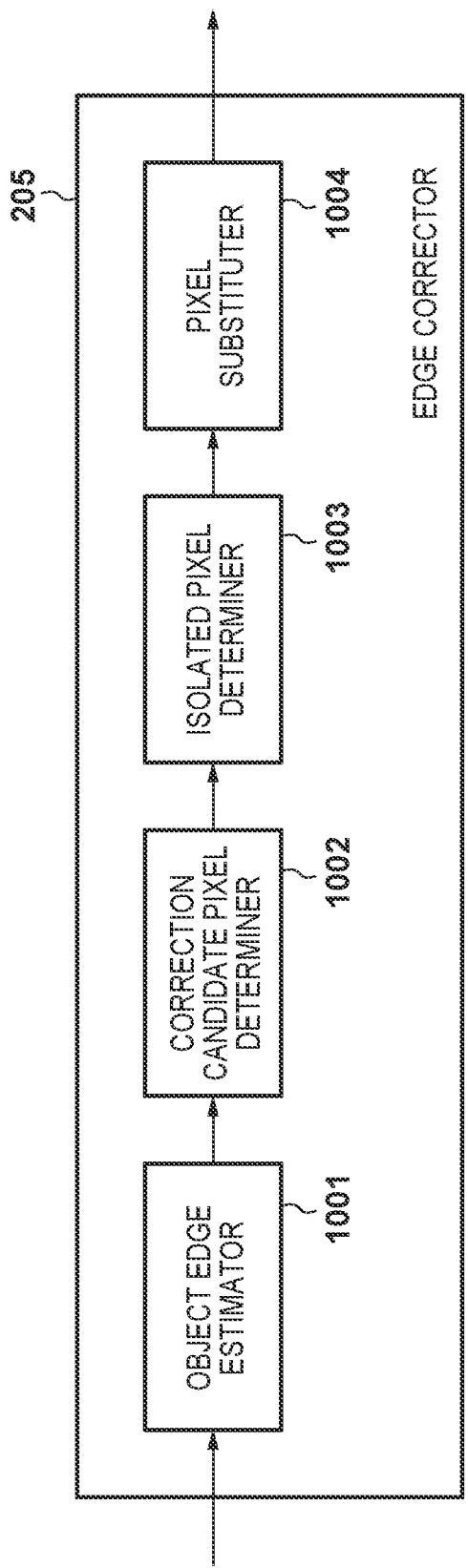
FIG. 10 is a functional block diagram for describing functions of an edge corrector according to a second embodiment of the present invention.

FIG. 10 is a functional block diagram for describing functions of the edge corrector 205 according to the second embodiment of the present invention. The edge corrector 205 according to the second embodiment has an object edge estimator 1001, a correction candidate pixel determiner 1002, an isolated pixel determiner 1003, and a pixel substituter 1004. Here, the pixel substituter 1004 is the same as the pixel substituter 403 of the first embodiment.

Figures 11A, 11B, 11C, 11D, 11E:
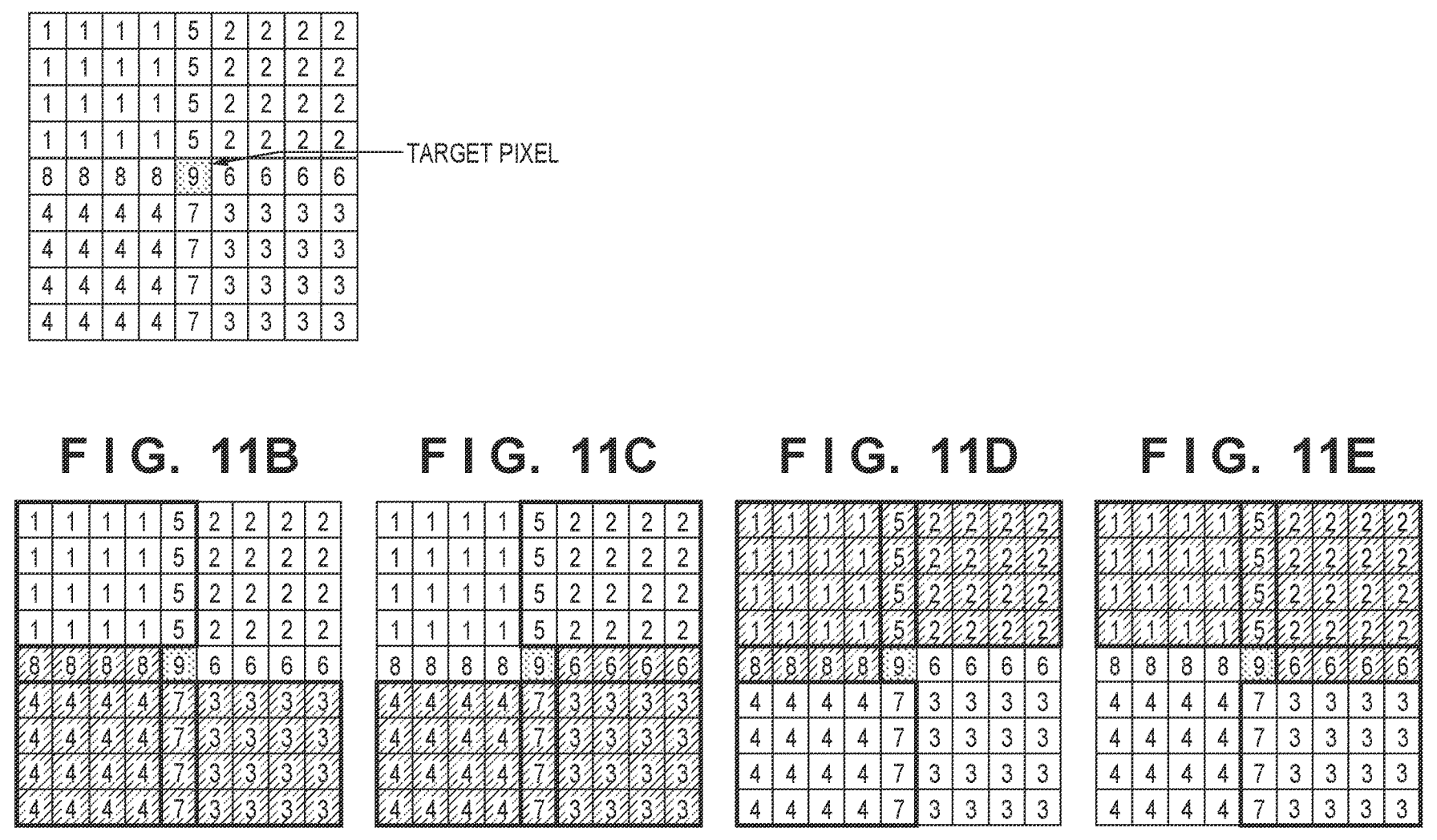

FIGS. 11A through 11I depict views for describing a reference window for determining whether or not there is an edge portion, and examples of pattern matching for an upper edge, a lower edge, a left edge, and a right edge of an object, in the object edge estimator 1001 according to the second embodiment. Note that the reference window used in the pattern matching illustrated in FIG. 11A is common with that of the first embodiment.

In the second embodiment, this reference window is applied to each pixel in the image data, and when the distribution of peripheral pixels for the target pixel matches a predetermined pattern that is described below, it is determined that the target pixel is positioned at an upper edge, a lower edge, a left edge, or a right edge of an object, respectively.

FIGS. 11B and 11C illustrate patterns for determining an upper edge of an object. In FIG. 11B, if the areas "1", and "5" are all white pixels, and there is even one black pixel for each of the areas "3", "4", "7", and "8", it is determined that the target pixel of the area "9" is positioned at an upper edge of the object that was subject to screen processing. Here, no determination in particular is made in relation to the areas "2" and "6". In FIG. 11C, if the areas "2", and "5" are all white pixels and there is even one black pixel for each of the areas "3", "4", "6", and "7", it is determined that the target pixel of the area "9" is positioned at an upper edge of the object that was subject to screen processing. Here, no determination in particular is made in relation to the areas "1" and "8".

FIGS. 11D and 11E illustrate patterns for determining a lower edge of an object. In FIG. 11D, if the areas "4", and "7" are all white pixels and if there is even one black pixel for each of the areas "1", "2", "5", and "8", it is determined that the target pixel of the area "9" is positioned at a lower edge of the object that was subject to screen processing. Here, no determination in particular is made in relation to the areas "3" and "6". In FIG. 11E, the areas "3", and "7" are all white pixels and there is even one black pixel in each of the areas "1", "2", "5", and "6", it is determined that the target pixel of the area "9" is positioned at a lower edge of the object that was subject to screen processing. Here, no determination in particular is made in relation to the areas "4" and "8".

Figures 11F, 11G, 11H, 11I:
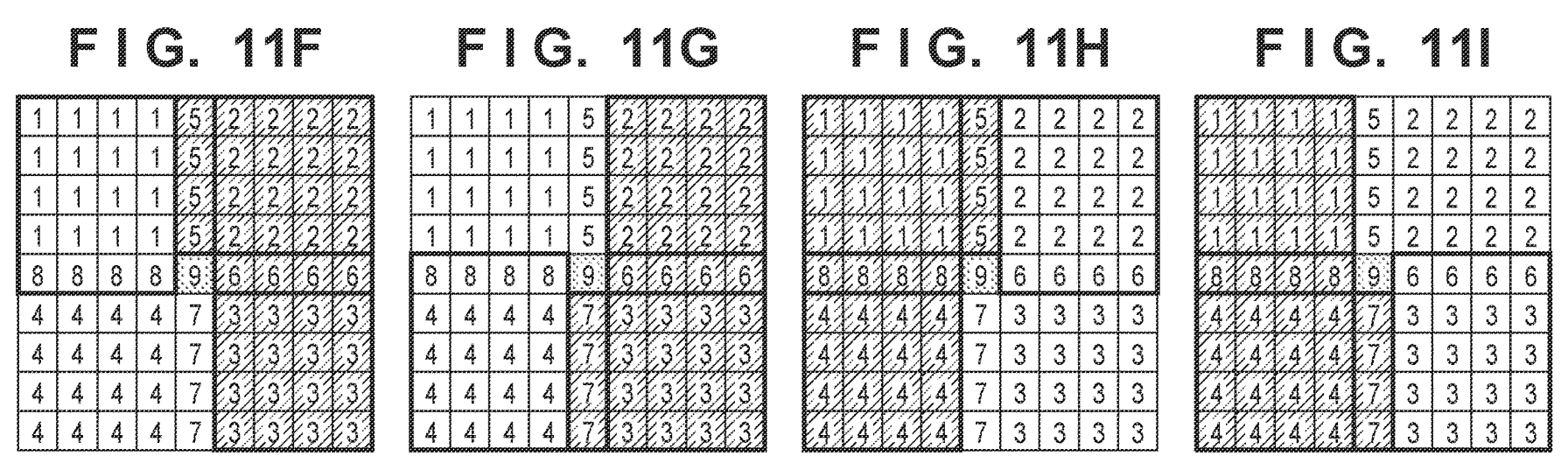

FIG. 11F and FIG. 11G illustrate patterns for determining a left edge of an object. In FIG. 11F, if the areas "1", and "8" are all white pixels and there is even one black pixel in each of the areas "2", "3", "5", and "6", it is determined that the target pixel of the area "9" is positioned at a left edge of the object that was subject to screen processing. Here, no determination in particular is made in relation to the areas "4" and "7". In FIG. 11G, if the areas "4", and "8" are all white pixels and there is even one black pixel in each of the areas "2", "3", "6", and "7", it is determined that the target pixel of the area "9" is positioned at a left edge of the object that was subject to screen processing. Here, no determination in particular is made in relation to the areas "1" and "5".

FIG. 11H and FIG. 11I illustrate patterns for determining a right edge of an object. In FIG. 11H, if the areas "2", and "6" are all white pixels, and there is even one black pixel in each of the areas "1", "4", "5", and "8", it is determined that the target pixel of the area "9" is positioned at a right edge of the object that was subject to screen processing. Here, no determination in particular is made in relation to the areas "3" and "7". In FIG. 11I, if the areas "3", and "6" are all white pixels and there is even one black pixel in each of the areas "1", "4", "7", and "8", it is determined that the target pixel of the area "9" is positioned at a right edge of the object that was subject to screen processing. Here, no determination in particular is made in relation to the areas "2" and "5".

In relation to the object edge pixels estimated by the object edge estimator 1001 in this way, the correction candidate pixel determiner 1002 determines whether or not there is a candidate pixel for which to perform correction processing in order to correct jaggies. Note that the determination by the correction candidate pixel determiner 1002 is performed in accordance with pattern matching.

FIGS. 12A through 12E depict views for describing pattern matching in the correction candidate pixel determiner 1002 according to the second embodiment.

FIG. 12A depicts a view illustrating an example of a reference window used by the correction candidate pixel determiner 1002.

FIGS. 12B through 12E illustrate examples of patterns used in determinations by the correction candidate pixel determiner 1002. In a case where there is a match with a pattern, the target pixel is determined to be a correction candidate pixel. The object edge estimator 1001 uses the pattern of FIG. 12B in relation to a pixel estimated to be an upper edge of an object. Similarly, the pattern of FIG. 12C is used in relation to a pixel estimated to be a lower edge of an object, the pattern of FIG. 12D is used in relation to a pixel estimated to be a left edge, and the pattern of FIG. 12E is used in relation to a pixel estimated to be a right edge. By using these patterns, if there is a black pixel at a position that is a certain distance from a target pixel, it is possible to determine that the target pixel is a correction candidate pixel.

Description in more detail is given below regarding pattern matching.

In FIG. 12B, if the target pixel at the area "9" is a white pixel and there is even one black pixel in the areas "1" or the areas "5" and there is even one black pixel in the areas "2" or the areas "7", then the target pixel is determined to be a correction candidate pixel.

Similarly, in FIG. 12C, if the target pixel at the area "9" is a white pixel and there is even one black pixel in the areas "3" or the areas "7" and there is even one black pixel in the areas "4" or the areas "5", then the target pixel is determined to be a correction candidate pixel.

In FIG. 12D, if the target pixel at the area "9" is a white pixel, and there is even one black pixel in the areas "4" or the areas "8" and there is even one black pixel in the areas "1" or the areas "6", then the target pixel is determined to be a correction candidate pixel.

In FIG. 12E, if the target pixel at the area "9" is a white pixel and there is even one black pixel in the areas "2" or the areas "6" and there is even one black pixel in the areas "3" or the areas "8", then the target pixel is determined to be a correction candidate pixel.

With respect to pixels determined by the correction candidate pixel determiner 1002 in this way to be candidate pixels for correction processing to be performed, the isolated pixel determiner 1003 determines whether or not the correction candidate pixel is an isolated pixel.

FIGS. 13A through 13D depict view for describing processing for determining an isolated pixel in the isolated pixel determiner 1003 according to the second embodiment.

Figure 13A:
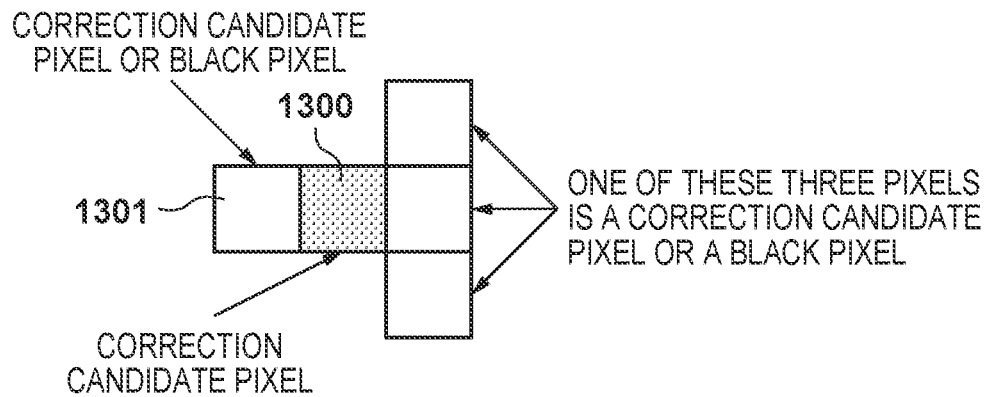
Figure 13B:
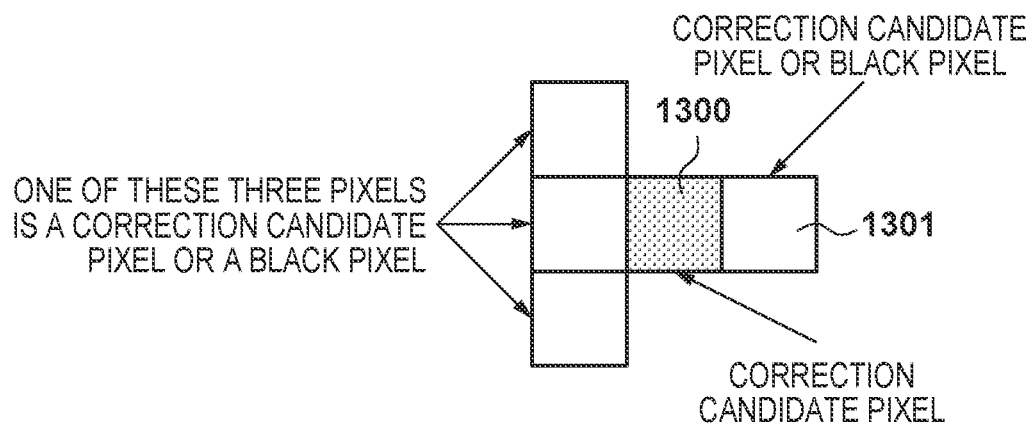

FIGS. 13A and 13B illustrate situations for determining whether or not a correction candidate pixel is an isolated pixel, with respect to the main scanning direction. For example, in FIG. 13A, in relation to a correction candidate pixel 1300, in a case where a pixel 1301 which is a black pixel or a correction candidate pixel is present adjacent to the left side of the correction candidate pixel 1300, and on the opposite side of the pixel 1301, a black pixel is present in a combination of three vertical pixels adjacent to the correction candidate pixel 1300, the correction candidate pixel 1300 is not an isolated pixel and thus becomes a correction target pixel. FIG. 13B illustrates a case where the pixel 1301 which is a correction candidate pixel or a black pixel is right-adjacent to the correction candidate pixel 1300, and in this case, if there is a black pixel in a combination of three vertical pixels adjacent to the correction candidate pixel 1300 on the opposite side of the pixel 1301, the correction candidate pixel 1300 is not an isolated pixel and thus becomes a correction target pixel.

In addition, FIGS. 13C and 13D illustrate situations for a determination of whether or not there is an isolated pixel with respect to the sub-scanning direction. For example, in FIG. 13C, in relation to a correction candidate pixel 1302, in a case where a pixel 1303 which is a black pixel or a correction candidate pixel is present upward of the correction candidate pixel 1302, and on the opposite side of the pixel 1303 a black pixel is present in a combination of three horizontal pixels adjacent to the correction candidate pixel 1302, the correction candidate pixel 1302 is not an isolated pixel and thus becomes a correction target pixel. FIG. 13D illustrates a case where the pixel 1303 which is a correction candidate pixel or a black pixel is below the correction candidate pixel 1302, and in this case, if there is a black pixel in a combination of three horizontal pixels adjacent to the correction candidate pixel 1302 on the opposite side of the pixel 1303, the correction candidate pixel 1302 is not an isolated pixel and thus becomes a correction target pixel.

Isolated pixels determined by the isolated pixel determiner 1003 in this way are removed from correction candidate pixels, and the pixel substituter 1004 performs pixel substitution on pixels that finally become targets of correction. In other words, the pixel substituter 1004 substitutes a white pixel with a black pixel.

Figure 14:
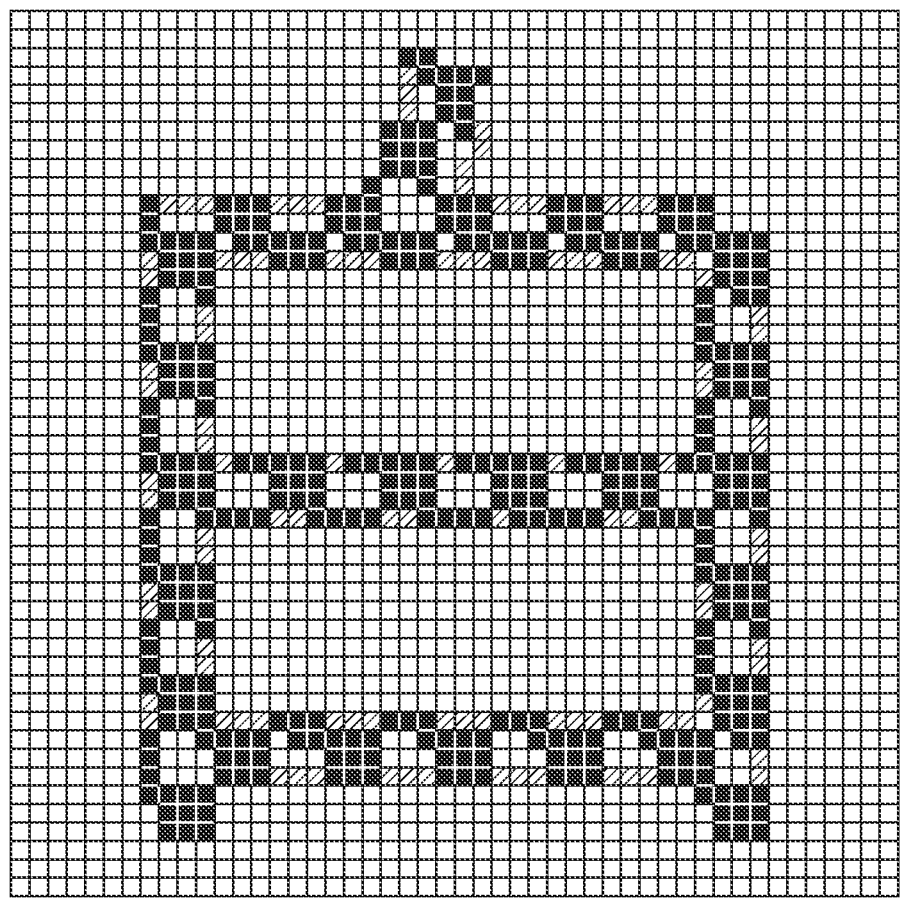
FIG. 14 depicts a view for describing an example of an effect of the second embodiment of the present invention.

FIG. 14 depicts a view for describing an example of an effect of the second embodiment of the present invention.

FIG. 14 illustrates an example of applying processing according to the second embodiment to image data after the screen processing of FIG. 3B. In the figure, pixels to which diagonal lines have been added indicate pixels for which substitution with black pixels has been performed as a result of processing by the edge corrector 205. In comparison to the first embodiment, it is understood that correction is also performed in relation to a portion crossed by an edge, and the jaggies of the edge portion are corrected.

Figure 15A:
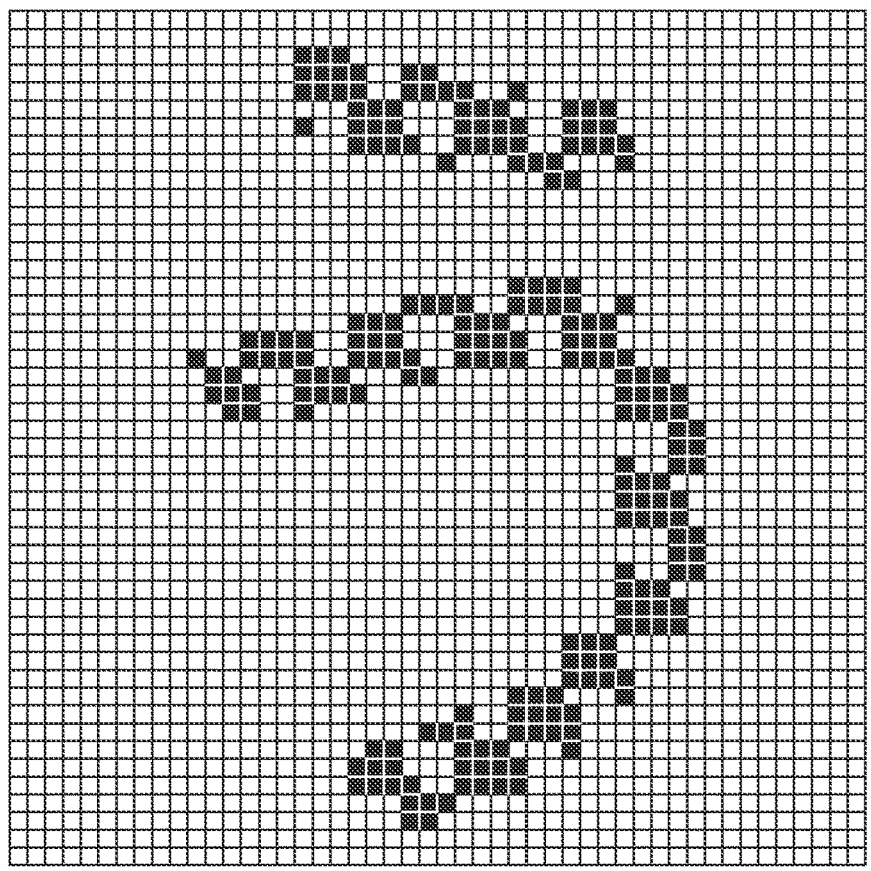
FIGS. 15A and 15B depict views for describing another example of an effect of the second embodiment.
Figure 15B:
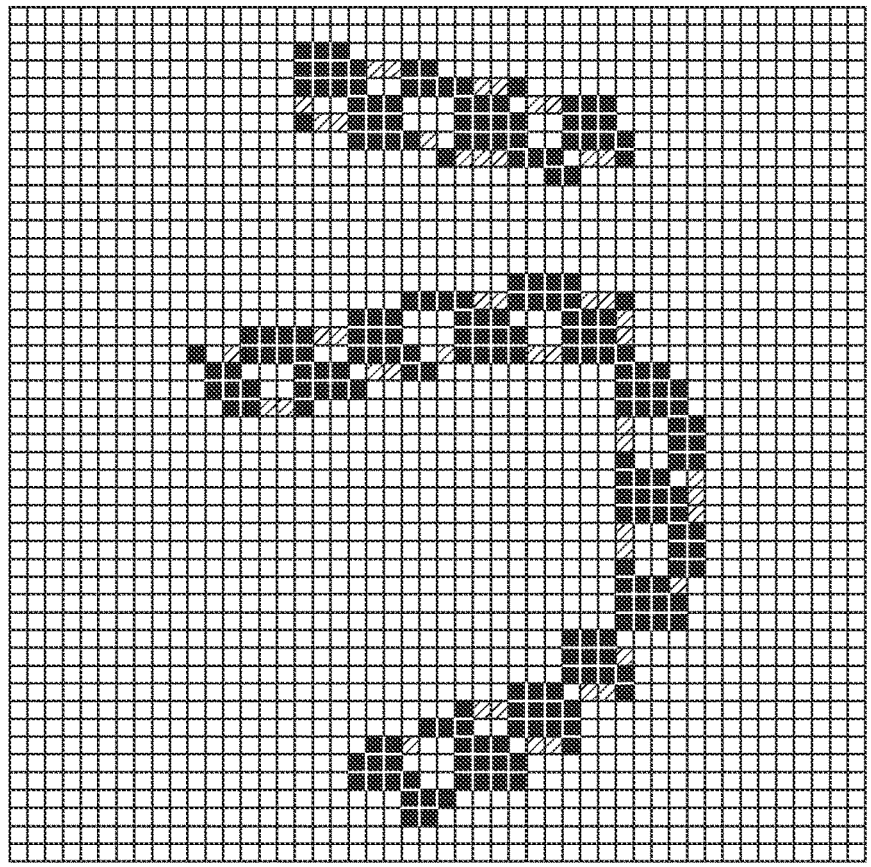

FIGS. 15A and 15B depict views for describing another example of an effect of the second embodiment.

FIG. 15A illustrates image data after screen processing, and data that is input to the edge corrector 205. FIG. 15B illustrates an example where the second embodiment is applied to the image data of FIG. 15A. In the figure, pixels to which diagonal lines have been added indicate pixels for which substitution with black pixels has been performed as a result of processing by the edge corrector 205.

In this way, in the second embodiment, correction is performed even with regard to portions that have curves, and it understood that the jaggies of edge portions are corrected even if they are curved portions.

By virtue of the second embodiment as described above, object edges in image data after screen processing are estimated, and it is determined whether or not pixels estimated to be these edges are correction target pixels based on information of peripheral pixels. A pixel determined to be a correction target pixel is substituted with a black pixel. With this, it is possible to correct the jaggies, which occur due to screen processing, of an edge portion in an oblique direction with respect to the horizontal direction and the vertical direction, as with crossed lines or curves.

Third Embodiment

In the first and second embodiments described above, in order to detect pixels that were not originally at the edge of an object, processing for determining isolated pixels and removing the isolated pixels from correction candidate pixels is performed due to determination errors in the object edge estimators 401 or 1001. However, because it is necessary for determination of isolated pixels to be performed with respect to output image data after estimation of object edges and determination of correction candidate pixels has first been performed, a larger buffer has been necessary.

Accordingly, in the third embodiment, description is given for an example of, when estimating the edges of an object, performing a determination of whether or not a target object has been subject to screen processing with more accuracy to thereby execute edge correction processing without performing a determination for isolated pixels. Note that, because the configuration of the system and the printing apparatus 111 according to the third embodiment are similar to that in the first embodiment described above, detailed description thereof is omitted.

Figure 16:
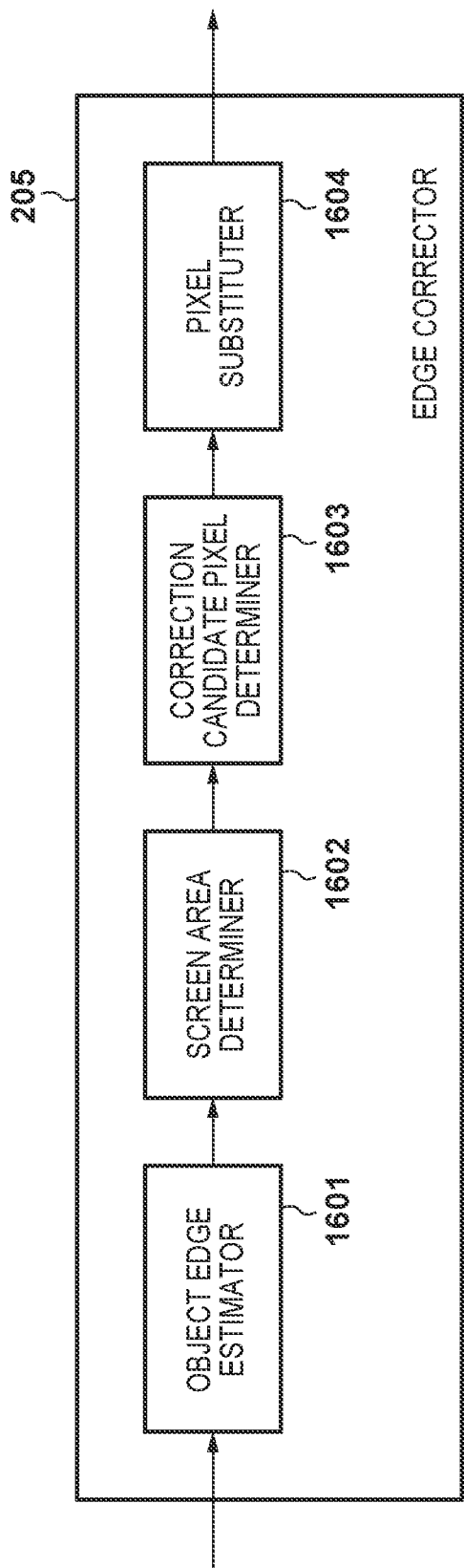
FIG. 16 is a functional block diagram for describing functions of an edge corrector according to a third embodiment of the present invention.

FIG. 16 is a functional block diagram for describing functions of the edge corrector 205 according to the third embodiment of the present invention. This edge corrector 205 has an object edge estimator 1601, a screen area determiner 1602, a correction candidate pixel determiner 1603, and a pixel substituter 1604. Here, the object edge estimator 1601, the correction candidate pixel determiner 1603, and the pixel substituter 1604 are similar to the object edge estimators 401 and 1001, the correction candidate pixel determiner 1002, and the pixel substituters 403 and 1004 in the first and second embodiments.

Figures 17A, 17B:
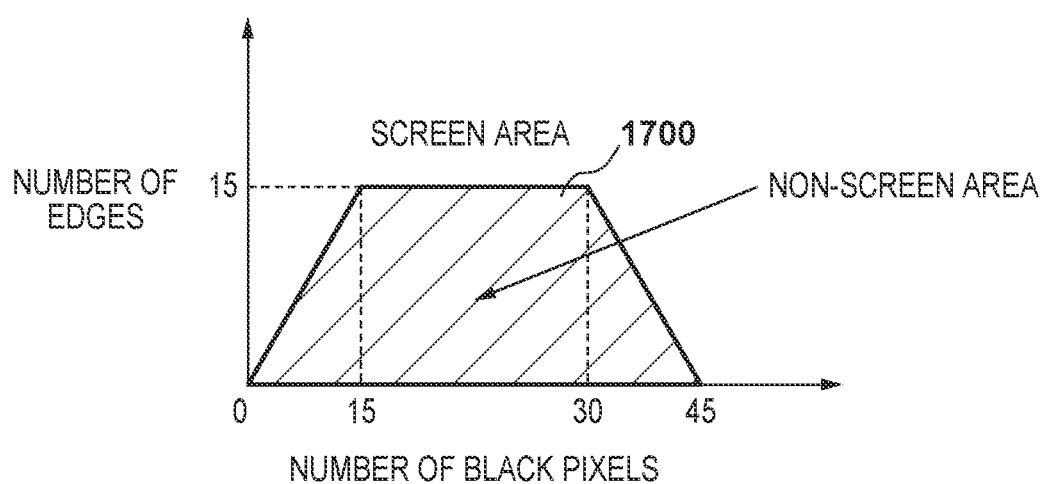
FIGS. 17A and 17B depict views for describing processing by a screen area determiner according to the third embodiment.

FIGS. 17A and 17B depict views for describing processing by the screen area determiner 1602 according to the third embodiment. FIGS. 17A and 17B illustrate an example where a target pixel is estimated to be an upper edge of an object by the object edge estimator 1601.

When the pixel of the area "9" is an upper edge of an object, in FIG. 17A, areas where it is thought that the object is present are the areas "3", "4", "6", "7", "8", and "9". The number of black pixels and the number of edges are counted for the areas "3", "4", "6", "7", "8", and "9" where it is thought that the object is present. In FIG. 17A, black pixels indicate pixels that are drawn as black. In addition, the edges are portions that change from a black pixel to a white pixel or change from a white pixel to a black pixel, and are line portions drawn with bold lines in FIG. 17A. In this example, the number of black pixels is "19" and the number of edges is "19".

FIG. 17B illustrates the relationship between an area that has been subject to screen processing and a non-screen area (for example, a text character or the like) that has not been subject to screen processing, in relation to the number of black pixels and the number of edges. In FIG. 17B, the maximum value of the number of black pixels is the case where the areas "3", "4", "6", "7", "8", and "9" are all black pixels, and thus is "45". In FIG. 17B, the area that is subject to screen processing is the area other than the non-screen area 1700. Consequently, the area that was subject to screen processing has a relatively larger number of edges with respect to the number of black pixels, in comparison to the non-screen area 1700. Using this characteristic, it is determined whether or not a target object has been subject to screen processing.

For example, an area where the number of black pixels is "19" and the number of edges is "19" can be determined to be a screen area that was subject to screen processing and is not a non-screen area. In this way, with respect to a pixel at an object edges estimated by the object edge estimator 1601, the screen area determiner 1602 determines whether or not the pixel is of an area where the object was subject to screen processing.

Accordingly, with respect to a pixel of an object edge that was subject to screen processing, the correction candidate pixel determiner 1603 determines whether or not it is a correction candidate pixel for correction processing in order to correct jaggies. This determination is similar to that in the second embodiment.

As a result of this determination, a pixel determined as a correction candidate pixel is a pixel that finally becomes a correction target, and the pixel substituter 1604 performs pixel substitution with respect to this pixel. In other words, white pixels are substituted with black pixels. As a result, it is possible to correct jaggies of edge portions that occur in a case of screen processing.

By virtue of the third embodiment as described above, object edges in image data after screen processing are estimated, and it is determined whether or not pixels estimated to be these edges are correction target pixels based on information of peripheral pixels. With this, when correction is performed, a pixel determined as a correction target pixel is substituted by a black pixel. With this, it is possible to correct jaggies of edge portions that occur in a case of screen processing.

Note that, in the embodiments described above, a white pixel that is a correction target is substituted by a black pixel, but the present invention is not limited to this, and configuration may be taken such that, in a case where the density of a halftone area of an object is comparatively low, pixels to substituted by black pixels are thinned, and substituted with staggered black pixels, for example.

In addition, in the case of color image data, configuration may be taken to perform correction processing according to the embodiments described above with respect to data of each color.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-254401, filed Dec. 28, 2017, which is hereby incorporated by reference herein in its entirety.

What is claimed is:

1. An image processing apparatus, comprising:
   a controller having a processor which executes instructions stored in a memory or having a circuitry, the controller functioning as:
   an estimation unit configured to, based on a target pixel of image data obtained by performing a halftone process on multi-gradation image data, where the image data resulting from performing the halftone process has a lower gradation than the multi-gradation image data, and peripheral pixels of the target pixel, estimate whether or not the target pixel is a pixel that corresponds to an edge portion of an object included in the image data;
   a determination unit configured to, if the target pixel estimated to be positioned at the edge portion by the estimation unit is a white pixel, determine whether or not the target pixel is an isolated pixel based on the peripheral pixels of the target pixel; and
   a correction unit configured to correct the target pixel, which is determined to not be the isolated pixel by the determination unit, to a pixel having a predetermined density or more.

2. The image processing apparatus according to claim 1, wherein, in a case where a plurality of pixels that configure the image data resulting from the halftone process are set in order to the target pixel and the target pixel and a distribution of the peripheral pixels of the target pixel match with a predetermined pattern, the estimation unit estimates the target pixel as a pixel corresponding to the edge portion of the object.

3. The image processing apparatus according to claim 1, wherein the estimation unit estimates whether or not the target pixel is a pixel positioned at an edge portion in a main scanning direction or a sub-scanning direction of the object, and
   wherein the determination unit, based on whether or not there is a black pixel or a pixel estimated to be positioned at the edge portion by the estimation unit that is adjacent in the main scanning direction or the sub-scanning direction to the target pixel which is a white pixel, determines whether or not the white pixel estimated to be positioned at the edge portion is an isolated pixel.

4. The image processing apparatus according to claim 3, wherein the estimation unit further estimates whether or not the target pixel is a pixel corresponding to an edge portion in an oblique direction with respect to the main scanning direction or the sub-scanning direction, and
   wherein the determination unit further determines, based on whether or not there is a pixel estimated to be positioned at the edge portion by the estimation unit or a black pixel that is adjacent in the oblique direction to the target pixel that is the white pixel, whether or not the white pixel estimated to be positioned at the edge portion is the isolated pixel.

5. The image processing apparatus according to claim 1, wherein the correction unit substitutes the white pixel with a black pixel.

6. The image processing apparatus according to claim 2, wherein a size of the predetermined pattern changes in accordance with a resolution at which image data after correction is output.

7. The image processing apparatus according to claim 2, wherein a size of the predetermined pattern changes in accordance with a number of screen lines that are applied.

8. A method of controlling an image processing apparatus, the method comprising:
   based on a target pixel of image data obtained by performing a halftone process on multi-gradation image data, where the image data resulting from performing the halftone process has a lower gradation than the multi-gradation image data, and peripheral pixels of the target pixel, estimating whether or not the target pixel is a pixel that corresponds to an edge portion of an object included in the image data;
   if the target pixel estimated to be positioned at an edge portion is a white pixel, determining whether or not the target pixel is an isolated pixel based on the peripheral pixels of the target pixel; and
   correcting the target pixel, which is determined to not be the isolated pixel, to a pixel having a predetermined density or more.

9. A non-transitory computer-readable storage medium storing a program for causing a processor to execute a method of controlling an image processing apparatus, the method comprising:
   based on a target pixel of image data obtained by performing a halftone process on multi-gradation image data, where the image data resulting from performing the halftone process has a lower gradation than the multi-gradation image data, and peripheral pixels of the target pixel, estimating whether or not the target pixel is a pixel that corresponds to an edge portion of an object included in the image data;
   if the target pixel estimated to be positioned at an edge portion is a white pixel, determining whether or not the target pixel is an isolated pixel based on the peripheral pixels of the target pixel; and
   correcting the target pixel, which is determined to not be the isolated pixel, to a pixel having a predetermined density or more.

* * * * *